United States Patent
Park et al.

(10) Patent No.: US 9,787,813 B2
(45) Date of Patent: *Oct. 10, 2017

(54) METHOD AND APPARATUS FOR STORING DATA IN MOBILE TERMINAL

(75) Inventors: Hyun-Woo Park, Seoul (KR); Seung-Yeol Lee, Seongnam-si (KR); Byung-Il Han, Seoul (KR); Min-Cheol Kang, Suwon-si (KR); Chan-Hee Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,379

(22) Filed: Sep. 27, 2011

(65) Prior Publication Data

US 2012/0023137 A1 Jan. 26, 2012

Related U.S. Application Data

(63) Continuation of application No. 12/188,614, filed on Aug. 8, 2008.

(30) Foreign Application Priority Data

Aug. 10, 2007 (KR) .................. 10-2007-0080481

(51) Int. Cl.
*G06F 17/30* (2006.01)
*H04M 1/725* (2006.01)
*H04N 1/21* (2006.01)
*H04N 1/00* (2006.01)

(52) U.S. Cl.
CPC .... *H04M 1/72522* (2013.01); *G06F 17/3012* (2013.01); *H04N 1/2104* (2013.01); *H04M 1/72555* (2013.01); *H04M 2250/52* (2013.01); *H04N 1/00307* (2013.01); *H04N 2201/0087* (2013.01); *H04N 2201/328* (2013.01); *H04N 2201/3229* (2013.01)

(58) Field of Classification Search
USPC ................................................. 707/780, 680
See application file for complete search history.

(56) References Cited

U.S. PATENT DOCUMENTS

| 5,819,261 | A * | 10/1998 | Takahashi et al. |
| 6,211,795 | B1 | 4/2001 | Izuta |
| 6,226,630 | B1 | 5/2001 | Billmers |
| 8,359,331 | B2 * | 1/2013 | Petri ..................... G06F 17/301 |
| | | | 707/780 |
| 2002/0087584 | A1 | 7/2002 | Hung |

(Continued)

FOREIGN PATENT DOCUMENTS

| CN | 1197356 A | 10/1998 |
| CN | 1913546 A | 2/2007 |

(Continued)

*Primary Examiner* — Shyue Jiunn Hwa
(74) *Attorney, Agent, or Firm* — Jefferson IP Law, LLP

(57) ABSTRACT

An apparatus and method for storing an image in a storage folder corresponding to a file name in a mobile device are provided. The method includes obtaining a keyword list by analyzing a file name of the data to be stored, searching for at least one storage folder having a folder name corresponding to at least one keyword included in the keyword list, determining one of the found storage folders, and storing the data in the determined storage folder.

15 Claims, 5 Drawing Sheets

(56) References Cited

U.S. PATENT DOCUMENTS

| | | | |
|---|---|---|---|
| 2002/0167683 A1* | 11/2002 | Hanamoto | G06F 3/1205 358/1.14 |
| 2003/0063321 A1* | 4/2003 | Inoue | H04N 1/32112 358/302 |
| 2004/0148453 A1 | 7/2004 | Watanabe et al. | |
| 2005/0044084 A1 | 2/2005 | Huang | |
| 2006/0074992 A1 | 4/2006 | Kim et al. | |
| 2006/0195465 A1* | 8/2006 | Atchison | G06F 17/30011 |
| 2006/0221190 A1 | 10/2006 | Limberis et al. | |
| 2007/0043700 A1* | 2/2007 | Dawson | G06F 17/30126 |
| 2007/0051793 A1* | 3/2007 | Katoh | G06F 17/30265 235/375 |
| 2007/0061284 A1 | 3/2007 | Kim | |
| 2007/0128899 A1* | 6/2007 | Mayer | G06F 9/4406 439/152 |
| 2007/0143349 A1* | 6/2007 | Iwasaki | G06F 17/30067 |
| 2007/0168455 A1* | 7/2007 | Sun | G06F 21/6209 709/217 |
| 2007/0220441 A1 | 9/2007 | Melton et al. | |
| 2008/0065707 A1* | 3/2008 | Iwasaki | G06F 3/0614 |
| 2008/0140608 A1* | 6/2008 | Takahashi | G06F 17/30637 |
| 2008/0168340 A1 | 7/2008 | Jang | |
| 2008/0244469 A1 | 10/2008 | Turcotte et al. | |
| 2008/0273095 A1* | 11/2008 | Koike | H04N 1/2112 348/231.7 |
| 2009/0043732 A1* | 2/2009 | Lee | G06F 17/30864 |
| 2009/0112850 A1* | 4/2009 | Toyoda | G06F 19/28 |

FOREIGN PATENT DOCUMENTS

| | | |
|---|---|---|
| JP | 2004-192212 A | 7/2004 |
| KR | 10-0690728 B1 | 3/2007 |
| WO | 2005/122563 A1 | 12/2005 |

* cited by examiner

METHOD AND APPARATUS FOR STORING DATA IN MOBILE TERMINAL

PRIORITY

This application is a continuation of U.S. patent application Ser. No. 12/188,614, filed on Aug. 8, 2008, which claims the benefit under 35 U.S.C. §119(a) of a Korean patent application filed in the Korean Intellectual Property Office on Aug. 10, 2007 and assigned Serial No. 10-2007-0080481, the entire disclosure of each of which is hereby incorporated by reference.

BACKGROUND OF THE INVENTION

1. Field of the Invention

The present invention relates to a method and apparatus for storing data in a mobile terminal. More particularly, the present invention relates to a method and apparatus for storing a desired image in a corresponding storage folder in a mobile terminal.

2. Description of the Related Art

Mobile terminals have become necessities of modern life for people of all ages. Thus, service providers and terminal manufacturers are competitively developing differentiated products and services.

For example, the mobile terminal has developed into a multimedia device capable of providing various services such as phonebooks, games, short messages, e-mails, wake-up calls, MPEG-1 Audio Layer 3 (MP3) players, digital cameras, and wireless Internet services.

With a prevalent use of a mobile terminal equipped with a digital camera module, a user can capture a variety of images anytime anywhere. In addition, the number of pixels supportable by the digital camera module is increasing, and thus the mobile terminal may perform a function of a high-definition digital camera.

Moreover, a data storage capacity of the mobile terminal is increasing, and as a result, the user may store large-volume data such as an image file, a video file, a music file and the like.

The large-volume storage capacity allows the user to use the mobile terminal as a storage medium. However, data management is difficult when the large-volume data is stored.

For example, if the user enjoys using a camera function of the mobile terminal, hundreds of image files may be stored in the mobile terminal. In this case, the images may be managed by storing them in storage folders according to image file properties.

Since the storage folders are determined by selecting respective image files, it is difficult to manage the folders for storing the images.

Therefore, a need exists for an improved method and apparatus for storing a desired image in a corresponding storage folder in a mobile terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for storing a desired image in a corresponding storage folder in a mobile terminal.

Another aspect of the present invention is to provide an apparatus and method for analyzing a keyword of an image file name when an image is stored in a mobile terminal.

Another aspect of the present invention is to provide an apparatus and method for storing an image in a storage folder corresponding to a keyword in a mobile terminal.

In accordance with an aspect of the present invention, a method of managing data to be stored in a mobile device is provided. The method includes obtaining a keyword list by analyzing a file name of the data to be stored, searching for at least one storage folder having a folder name corresponding to at least one keyword included in the keyword list, determining one of the found storage folders, and storing the data in the determined storage folder.

In accordance with an aspect of the present invention, a method of managing data to be stored in an electronic device is provided. The method includes obtaining a keyword list by analyzing a file name of the data to be stored, searching for at least one storage folder having a folder name corresponding to at least one keyword included in the keyword list, determining one of the found storage folders, and storing the data in the determined storage folder.

In accordance with another aspect of the present invention, an apparatus for managing data to be stored in a mobile device is provided. The apparatus includes a keyword detector for obtaining a keyword list by analyzing a file name of the data to be stored, and a controller for searching for at least one storage folder having a folder name corresponding to at least one keyword included in the keyword list, determining one of the found storage folders, and storing the data in the determined storage folder.

In accordance with another aspect of the present invention, an apparatus for managing data to be stored in an electronic device is provided. The apparatus includes a keyword detector for obtaining a keyword list by analyzing a file name of the data to be stored, and a controller for searching for at least one storage folder having a folder name corresponding to at least one keyword included in the keyword list, determining one of the found storage folders, and storing the data in the determined storage folder.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions will be omitted for clarity and conciseness.

A method and apparatus are provided for storing data in a storage folder corresponding to a file name of the data in a mobile terminal Examples of the mobile terminal include a cellular phone, a Personal Communication System (PCS) phone, a Personal Digital Assistant (PDA), an International Mobile Telecommunication-2000 (IMT-2000) phone, and a Fourth Generation (4G) broadband system phone. In the following detailed descriptions, a general configuration of the mobile terminal will be explained as an example.

The data to be stored includes a text file, a music file, a video file, an image file, and the like. In the following detailed descriptions, the image file will be explained as an example.

Figure 1:
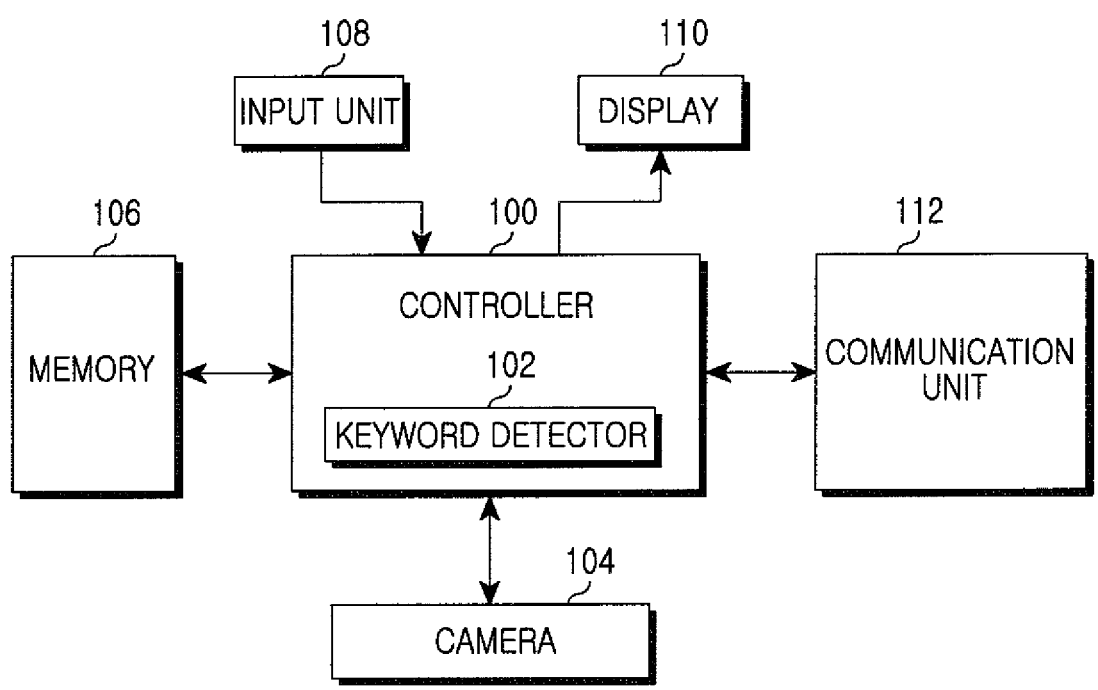
FIG. 1 is a block diagram illustrating a structure of a mobile terminal for storing an image according to an exemplary embodiment of the present invention.

FIG. 1 is a block diagram illustrating a structure of a mobile terminal for storing an image according to an exemplary embodiment of the present invention.

Referring to FIG. 1, the mobile terminal includes a controller 100, a keyword detector 102, a camera 104, a memory 106, an input unit 108, a display 110, and a communication unit 112.

The controller 100 may provide overall control to the mobile terminal. For example, a voice call or data communication may be processed and controlled by the controller 100. In addition to general operations, the controller 100 may control the keyword detector 102 to analyze a file name of a desired image and to obtain a keyword of the file name.

Further, the controller 100 may determine an existence of a storage folder corresponding to the keyword obtained by the keyword detector 102. If the storage folder exists, the image is stored in the storage folder under the control of the controller 100.

When two or more keywords are provided from the keyword detector 102, the controller 100 can determine the existence of the storage folder according to a keyword order.

If the storage folder corresponding to the keyword does not exist, the controller 100 creates a storage folder corresponding to the keyword and thereafter provides control to store the image.

The keyword detector 102 receives the file name of the image under the control of the controller 100. Then, the keyword detector 102 analyzes the image file name to obtain the keyword of the image file name, and provides the obtained keyword to the controller 100.

The keyword detector 102 may obtain the keyword by using a spacing word or a special character of the image file name.

The camera 104 captures a desired image and then provides control to store the captured image in the memory 106.

The memory 106 includes a Read Only Memory (ROM), a Random Access Memory (RAM), and a flash ROM. The ROM stores a microcode of a program, by which the controller 100 is processed and controlled, and a variety of reference data.

The RAM is a working memory of the controller 100 and stores temporary data that is generated while programs are performed. The flash ROM stores rewritable data, such as phonebook entries, outgoing messages, incoming messages and the like.

The input unit 108 includes a plurality of function keys such as numeral key buttons of '0' to '9', a menu button, a cancel (or delete) button, an OK button, a talk button, an end button, an Internet access button, a navigation (or direction) key button, and a character input key. Key input data (e.g., a request to store images), which is input when the user presses these function keys, is provided to the controller 100.

The display 110 displays information such as state information, which is generated while the mobile terminal operates, limited numeral characters, large-sized moving and still pictures, etc. The display 110 may be provided as a Liquid Crystal Display (LCD). In this case, the display 110 may include a controller for controlling the LCD, a video memory in which image data is stored and an LCD element. If the LCD is provided as a touch screen, the display 110 may perform a part or all of the functions of the input unit 108.

The communication unit 112 is configured to include a Radio Frequency (RF) transmitter (not shown) for up-converting the frequency of transmitted signals and amplifying the transmitted signals, and an RF receiver (not shown) for low-noise amplifying of received RF signals and down-converting the frequency of the received RF signals. The communication unit 112 transmits/receives an RF signal of data that is input/output through an antenna (not shown). For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data.

The keyword detector 102 may operate under the control of the controller 100. Although the keyword detector 102 and the controller 100 are separately configured in the present invention, this separate configuration is for explanation purposes only. Thus, in practice, the keyword detector 102 may be controller by the controller 100.

Figure 2:
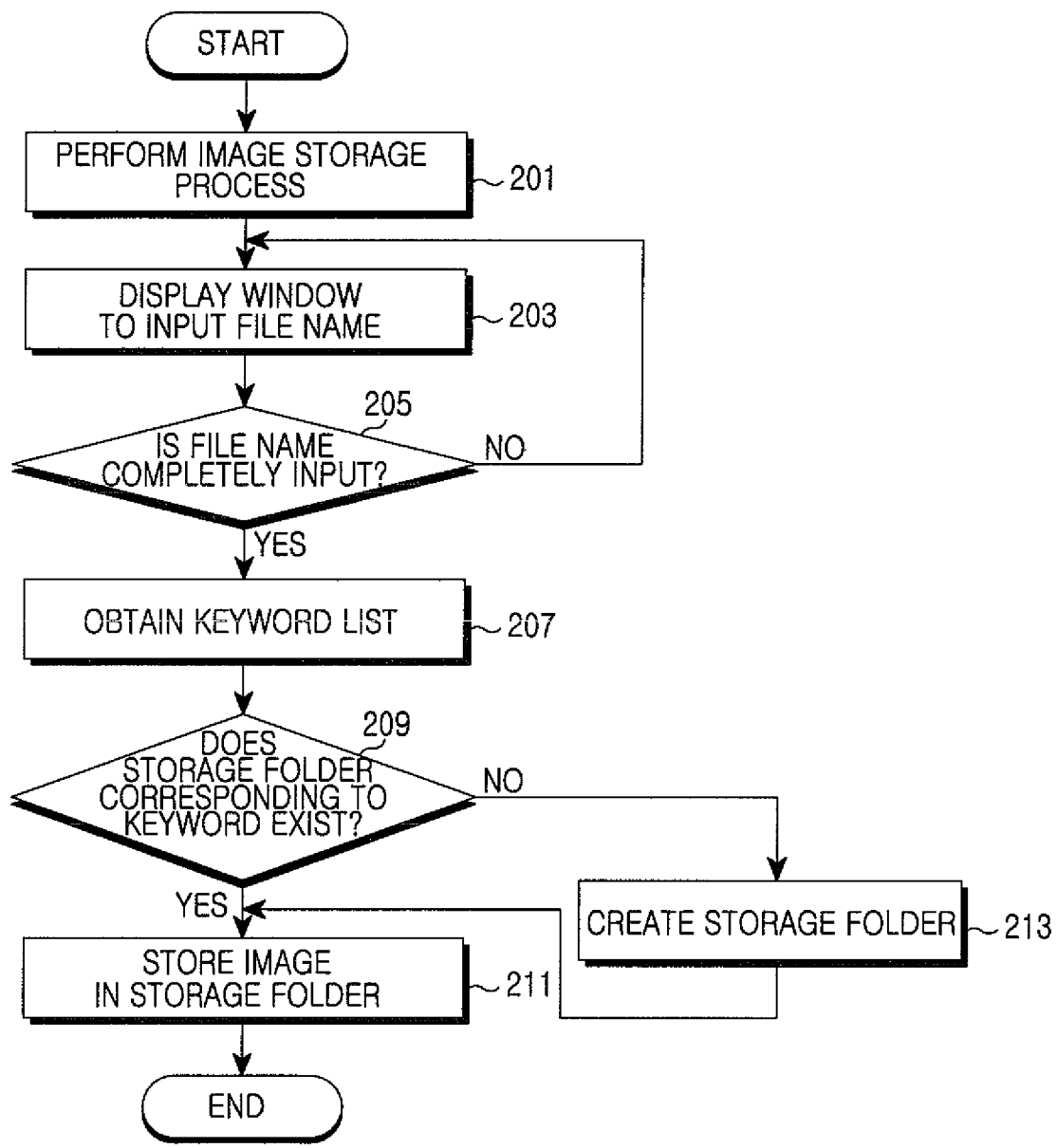
FIG. 2 is a flowchart illustrating a process of storing an image file in a mobile terminal according to an exemplary embodiment of the present invention.

FIG. 2 is a flowchart illustrating a process of storing an image file in a mobile terminal according to an exemplary embodiment of the present invention.

Referring to FIG. 2, the controller 100 (see FIG. 1) of an exemplary embodiment of the present invention performs an image storage process in step 201. Then, the controller 100 controls the display 110 to display an input window so that a user can input a file name of a desired image in step 203.

Next, the controller 100 determines whether the user finishes the input of the image file name in step 205.

If the input of the file name is not finished, the controller 100 returns to step 203.

Otherwise, if the input of the file name is finished, the controller 100 obtains a keyword list for the image file name in step 207. The keyword list denotes a list of specific words for selecting a storage folder of the image.

For example, if a desired image file name input by the user is "journey to Jeju-island", a specific word for selecting the storage folder of the image is "Jeju-island" and "journey". Thus, the keyword list of the specific words includes "Jeju-island" and "journey". The image can be stored in a storage folder having a folder name of "Jeju-island" or "journey"

If the obtained keyword list includes a plurality of keywords, the controller 100 can determine a priority according to a word position.

For example, if the obtained keyword list includes keywords of "Jeju-island" and "journey", the image may be stored with priority in the storage folder having a folder name of "Jeju-island" under the control of the controller 100.

The keyword list can be provided from the keyword detector 102. A method of creating the keyword by the keyword detector 102 will be described in detail with reference to FIG. 3.

The controller 100 may determine an existence of the storage folder corresponding to the specific words included in the keyword list in step 209.

If the storage folder exists, the controller 100 stores the image in the folder in step 211.

In this step, a popup window may be displayed so that the user can choose whether to store the image. The popup window may show a message, for example, "Do you want to store the image in the folder?"

In contrast, if the storage folder does not exist, the controller 100 creates a storage folder corresponding to the specific words in step 213. Then, the controller 100 stores the image in the created storage folder.

The controller 100 may receive a keyword input from the user when the storage folder is created, and store images related to the folder. The input keyword may be used as a keyword of the storage folder according to a choice of the user of the mobile terminal.

For example, if the storage folder is created according to the keyword of "journey" input by the user, the folder can be used as a storage folder for storing images related to journey.

Thereafter, the procedure of FIG. 2 ends.

Figure 3:
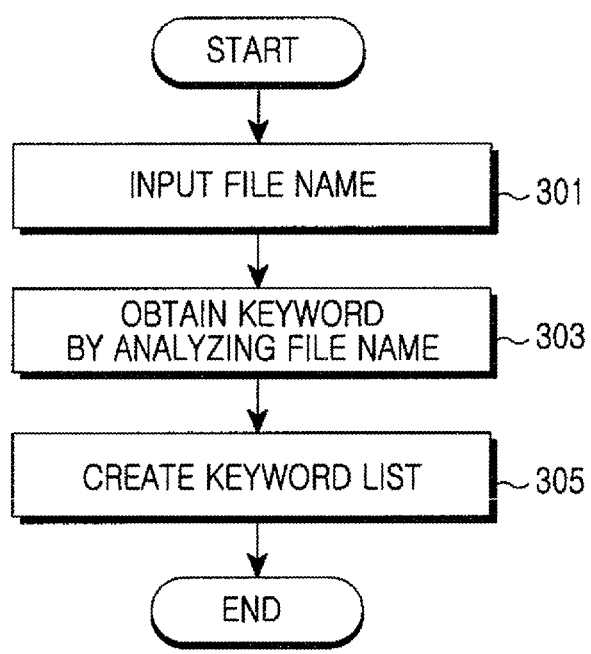
FIG. 3 is a flowchart illustrating a process of obtaining a keyword by a keyword detector of a mobile terminal according to an exemplary embodiment of the present invention.

FIG. 3 is a flowchart illustrating a process of obtaining a keyword by the keyword detector 102 of FIG. 1 according to an exemplary embodiment of the present invention. A process of obtaining a keyword of a desired image file to be stored will also be described with reference to FIG. 4.

Referring to FIG. 3, the keyword detector 102 receives information on a file name input by a user from the controller 100 in step 301.

Next, the keyword detector 102 analyzes the received file name and obtains keywords in step 303, and creates a list of the obtained keywords in step 305.

For example, if a user of the mobile terminal inputs the file name for storing an image, the keyword detector 102 analyzes the received file name and obtains keywords of the file name.

Figure 4:
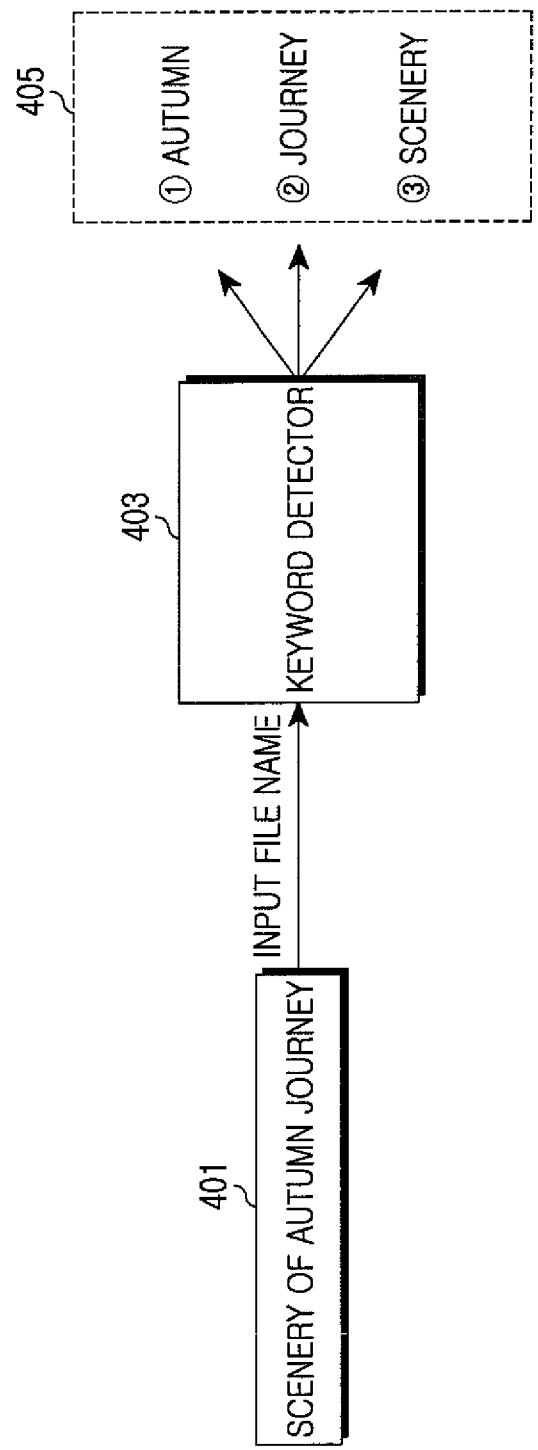
FIG. 4 illustrates a process of obtaining a keyword of a desired image file to be stored.

More specifically, as shown in FIG. 4, if a received file name is "scenery of autumn journey" in step 401, the keyword detector 102 begins to analyze the file name in step 403. As a result of analyzing the file name, specific words "autumn", "journey", and "scenery" can be obtained by the keyword detector 102 in step 405.

In this case, the keyword detector 102 can obtain the keywords by parsing the file name with a spacing word, a special character, etc. For example, if the file name input by a user is "$autumn $journey $scenery photo", the keyword detector 102 can obtain keywords of "autumn", "journey", and "scenery" attached with a preset special character (e.g., $).

In addition, when the above file name is input by the user, the keyword detector 102 can provide the controller 100 with only words remaining after removing the keywords of "autumn", "journey", and "scenery" from the file name of "$autumn $journey $scenery photo". The provided words can be used as a storage name for the image file. In other words, "photo" is an actual storage file name of the file name of "$autumn $journey $scenery photo".

Next, the keyword detector 102 creates a list of the obtained keywords and provides the list to the controller 100.

Next, the procedure of FIG. 3 ends.

FIGS. 5A, 5B, 5C and 5D illustrate screens of a mobile terminal for performing a process of storing an image file according to an exemplary embodiment of the present invention.

Figure 5A:
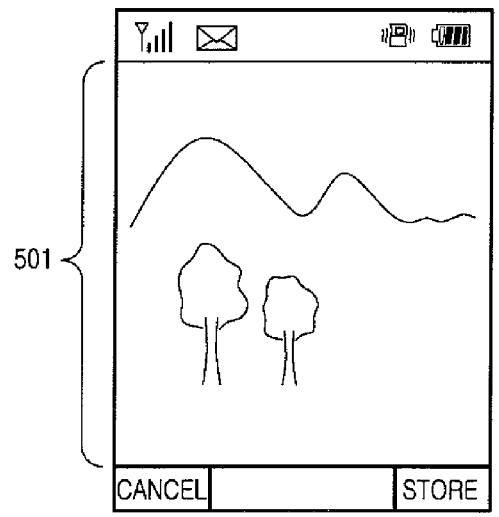
FIGS. 5A, 5B, 5C and 5D illustrate screens of a mobile terminal for performing a process of storing an image file according to an exemplary embodiment of the present invention.

FIG. 5A illustrates a screen used to store a desired image in the mobile terminal.

Figure 5B:
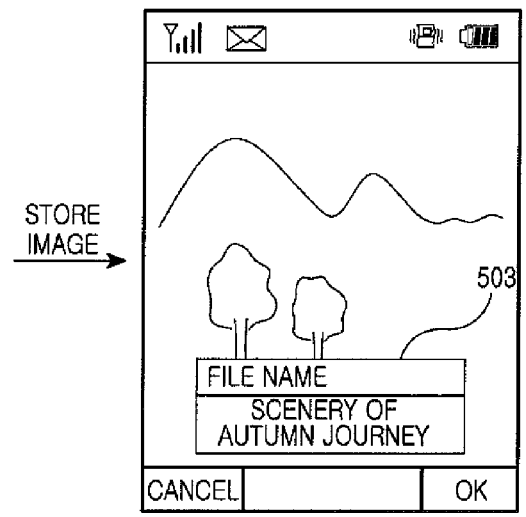

Referring to FIG. 5A, a user of the mobile terminal desires to store an image 501 in which a mountain and trees are captured. In this case, as shown in FIG. 5B, the mobile terminal displays an input window 503 so that the user can input a file name of the desired image.

When the image is stored, the user can select one folder in a list of storable folders through the input window. The selected folder can be displayed.

In other words, although an input widow is generally displayed when a captured image is stored, it is also possible to display the input window after a storage folder is selected.

After the file name is input, the mobile terminal analyzes the input file name and obtains a keyword list.

Figure 5D:
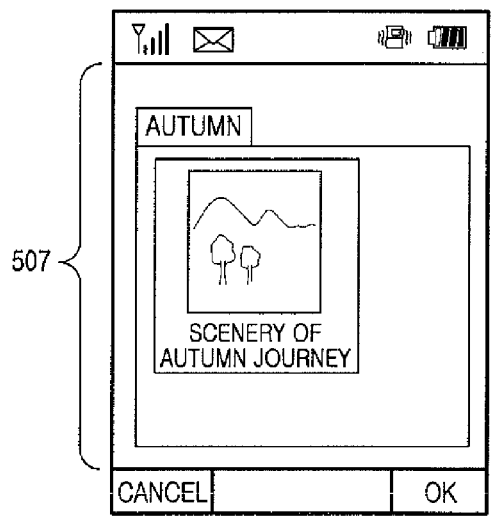
Figure 5C:
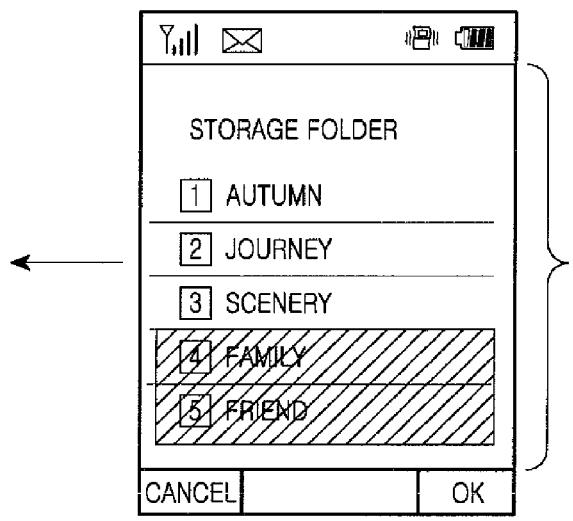

FIG. 5C illustrates a screen displayed after obtaining a keyword list based on a file name in a mobile terminal.

Referring to FIG. 5C, the screen of the mobile terminal displays storage folders 505 according to the keyword list of the input file name of FIG. 5B.

That is, for a desired image, the mobile terminal can display storage folders of which folder names are "autumn", "journey", and "scenery". When displaying the storage folders, folders not corresponding to the keywords can be displayed in a shaded view in order to be distinguished from other folders corresponding to the keywords.

FIG. 5D illustrates a screen for storing an image by using a keyword list in a mobile terminal. The mobile terminal stores a desired image in a storage folder of which a file name is determined to "autumn" among a plurality of storage folders corresponding to the keywords 507.

According to exemplary embodiments of the present invention, a mobile terminal analyzes a keyword of a file name of a desired image to be stored, determines a storage folder corresponding to the keyword, and stores the image in the storage folder. Therefore, the present invention can solve a problem which arises when a conventional mobile terminal is used for image file management and in which a user must change a storage folder by directly selecting an image file to be managed.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of managing data to be stored in an electronic device, the method comprising:
   responsive to detecting a request for storing temporary data, that is not stored in the electronic device, prompting, by at least one processor, a user to input a file name for a file for the temporary data;
   responsive to detecting, from the user input, a reception of the file name for the file for the temporary data, obtaining, by the at least one processor, a keyword list by analyzing the received file name, wherein the obtained keyword list includes each of a plurality of words included in the file name;
   determining, by the at least one processor, whether at least one storage folder having a folder name, that includes at least one keyword of the obtained keyword list, exists in the electronic device;
   responsive to identifying that the at least one storage folder having the folder name, that includes the at least one keyword of the keyword list, exists in the electronic device, displaying, on a screen, the identified at least one storage folder, wherein the at least one storage folder which the file to be stored can be added into, is searched without an additional user input in response to the reception of the file name; and
   responsive to detecting a user selection of the at least one storage folder among the displayed at least one storage folder which is determined with a priority according to a position order of the keywords in the file name, storing the temporary data as the file with the received file name in the user-selected at least one storage folder by a processor,
   wherein the electronic device comprises a mobile device.

2. The method of claim 1, further comprising:
   responsive to identifying that one storage folder having the folder name, that includes the at least one keyword of the keyword list, exists in the electronic device, displaying a popup window for determining whether the temporary data is to be stored in the identified one storage folder as the file.

3. The method of claim 2, further comprising:
   displaying at least one storage folder not corresponding to the at least one keyword of the keyword list in a shaded view.

4. The method of claim 1, further comprising:
   responsive to identifying that the at least one storage folder having the folder name, that includes the at least one keyword of the keyword list, does not exist in the electronic device, creating a new folder and storing the temporary data as the file in the created folder.

5. The method of claim 4, wherein the creating of the new folder comprises prompting the user to input a folder name.

6. The method of claim 1, wherein the obtaining of the keyword list comprises parsing at least one of a specific word, a special character, and a spacing word of the file name for the file for the temporary data.

7. The method of claim 6, wherein the temporary data comprises at least one of a text file, a music file, a video file, and an image file.

8. The method of claim 1, wherein characters remaining after removing the keyword list of the file name are used for an actual file name of the temporary data to be stored as a file.

9. An electronic device comprising:
   a screen;
   at least one processor; and
   at least one memory storing one or more computer programs configured to be executed by the at least one processor, the one or more computer programs including instructions for:
   prompting, responsive to detecting a request for storing temporary data, that is not stored in the electronic device, a user to input a file name for a file for the temporary data,
   obtaining, responsive to detecting, from the user input, a reception of the file name for the file for the temporary data, a keyword list by analyzing the received file name, wherein the obtained keyword list includes each of a plurality of words included in the file name,
   determining whether at least one storage folder having a folder name, that includes at least one keyword of the obtained keyword list, exists in the electronic device,
   displaying, responsive to identifying that the at least one storage folder having the folder name, that includes the at least one keyword of the keyword list, exists in the electronic device, the identified at least one storage folder via the screen, wherein the at least one storage folder which the file to be stored can be added into, is searched without an additional user input in response to the reception of the file name, and
   storing, responsive to detecting a user selection of the at least one storage folder among the displayed at least one storage folder which is determined with a priority according to a position order of the keywords in the file name, the temporary data as the file with the received file name in the user-selected at least one storage folder,
   wherein the electronic device comprises a mobile device.

10. The electronic device of claim 9, wherein, responsive to identifying that one storage folder having the folder name, that includes the at least one keyword of the keyword list, exists in the electronic device, the at least one processor is configured to display a popup window for determining whether the temporary data is to be stored in the identified one storage folder as the file.

11. The electronic device of claim 9, wherein, responsive to identifying that the at least one storage folder having the folder name, that includes the at least one keyword of the keyword list, does not exist in the electronic device, the at least one processor is configured to create a new folder and stores the temporary data as the file in the new folder.

12. The electronic device of claim 11, wherein the at least one processor is configured to prompt the user to input a folder name.

13. The electronic device of claim 9, wherein the at least one processor is configured to extract the keyword list by parsing a specific word, a special character, and a spacing word from the file name for the file for the temporary data.

14. The electronic device of claim 13, wherein the temporary data comprises at least one of a text file, a music file, a video file, and an image file.

15. The electronic device of claim 9, wherein characters remaining after removing the keyword list of the file name are used for an actual file name of the temporary data to be stored as a file.

* * * * *